United States Patent
Gruszka et al.

(10) Patent No.: US 11,327,707 B1
(45) Date of Patent: May 10, 2022

(54) MULTI-DEVICE INTERACTIVITY SYSTEM FOR A TOUCH SCREEN DISPLAY

(71) Applicant: Cisco Technology, Inc., San Jose, CA (US)

(72) Inventors: Thierry Gruszka, Le Raincy (FR); Axel Jean Georges Taldir, Allenc (FR); Eyal Shiber Shalev, Haifa (IL); Andre Surcouf, Leu la Foret (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/844,152

(22) Filed: Apr. 9, 2020

(51) Int. Cl.
*G06F 3/0488* (2013.01)
*G06F 3/14* (2006.01)

(52) U.S. Cl.
CPC .......... *G06F 3/1454* (2013.01); *G06F 3/0488* (2013.01)

(58) Field of Classification Search
CPC .... G06F 3/1454; G06F 3/147; G06F 3/04886; G06F 3/0488
See application file for complete search history.

(56) References Cited

U.S. PATENT DOCUMENTS

| | | | |
|---|---|---|---|
| 6,473,088 B1 * | 10/2002 | Matsumoto | G09G 5/363 345/530 |
| 8,390,577 B2 | 3/2013 | Lemort et al. | |
| 8,819,705 B2 | 8/2014 | Reeves et al. | |
| 9,052,817 B2 | 6/2015 | Hotelling | |
| 9,110,581 B2 | 8/2015 | Momchilov | |
| 2008/0028325 A1 * | 1/2008 | Ferren | G06F 3/017 715/753 |
| 2010/0231556 A1 | 9/2010 | Mines et al. | |
| 2011/0197147 A1 * | 8/2011 | Fai | G06F 3/017 715/753 |
| 2014/0149880 A1 * | 5/2014 | Farouki | H04L 12/1822 715/748 |
| 2014/0306865 A1 * | 10/2014 | Pan | G06F 3/1423 345/2.1 |

(Continued)

OTHER PUBLICATIONS

Lu Zhao et al., Implementation and Evaluation of Touch-Based Interaction Using Electrovibration Haptic Feedback in Virtual Environments, Mar. 1, 2020, IEEE Xplore, pp. 239-247 (Year: 2020).*

(Continued)

*Primary Examiner* — Tam T Tran
(74) *Attorney, Agent, or Firm* — Behmke Innovation Group LLC; Kenneth J. Heywood; Jonathon P. Western

(57) ABSTRACT

In one embodiment, an interactivity agent provides display data from a plurality of devices to a touch screen display via a network for simultaneous presentation on the touch screen display. The interactivity agent receives touch information regarding a touch action performed via the touch screen display with respect to the display data from a particular one of the plurality of devices. The interactivity agent translates the received touch information from the touch screen display into translated touch information for the particular device. The interactivity agent sends, to a particular device via the network, the translated touch information. The translated touch information causes the particular device to replicate the touch action on a display of the particular device.

17 Claims, 9 Drawing Sheets

(56) References Cited

U.S. PATENT DOCUMENTS

2017/0019473 A1* 1/2017 Venkataraman ........ H04L 41/22
2018/0011586 A1* 1/2018 Zhang ................. G06F 3/04842

OTHER PUBLICATIONS

Jun-Zhe Wang et a., Virtual Touch: A Finger Glove to Simulate Touch Screen Commands, Oct. 1, 2012, IEEE Xplore, pp. 1-4 (Year: 2012).*

Mcnaughton, James Andrew, "Adapting Multi-Touch Systems to Capitalise on Different Display Shapes", online: http://etheses.dur.ac.uk/850/, 2010, 204 pages, Durham Thesis, Durham University.

* cited by examiner

US 11,327,707 B1

MULTI-DEVICE INTERACTIVITY SYSTEM FOR A TOUCH SCREEN DISPLAY

TECHNICAL FIELD

The present disclosure relates generally to computer networks, and, more particularly, to a multi-device interactivity system for a touch screen display.

BACKGROUND

Collaboration equipment, such as those found in meeting rooms, are increasingly leveraging touch screen displays. For example, video walls now exist that allow for touch control, so that a user can quickly manipulate what is presented on screen. However, these systems are typically closed in that it is expected that the control device(s) all execute the same operating system. This imposes a strong constraint on the contents and applications developed for that operating system for use with the touch screen displays (e.g., in terms of resolutions, optimizations for multiple screens, etc.). In addition, this also creates a great potential for meeting attendees to realize too late that their own devices are incompatible with the collaboration equipment in a given room.

DESCRIPTION OF EXAMPLE EMBODIMENTS

Overview

Figure 1A:
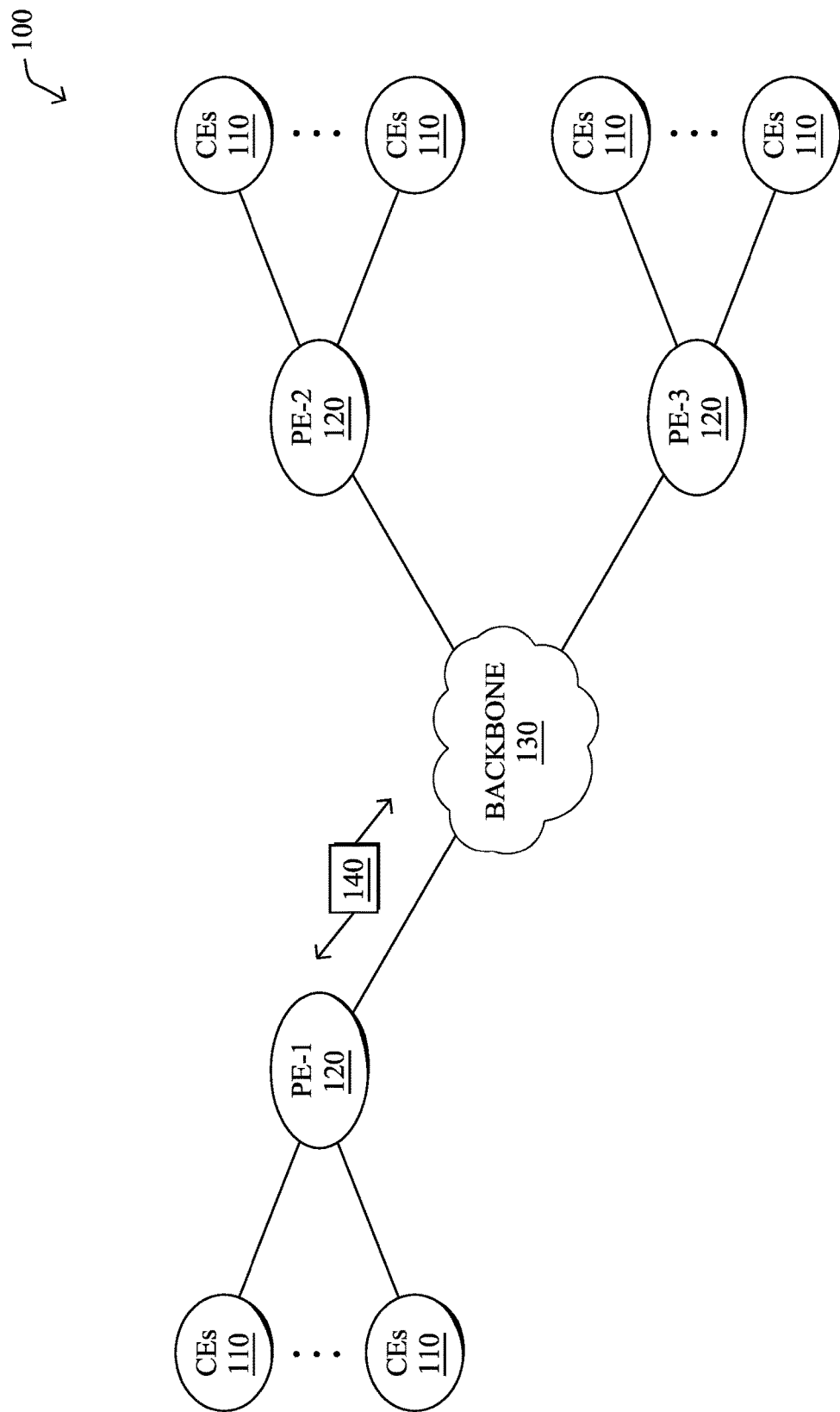
FIGS. 1A-1B illustrate an example communication network.

According to one or more embodiments of the disclosure, an interactivity agent provides display data from a plurality of devices to a touch screen display via a network for simultaneous presentation on the touch screen display. The interactivity agent receives touch information regarding a touch action performed via the touch screen display with respect to the display data from a particular one of the plurality of devices. The interactivity agent translates the received touch information from the touch screen display into translated touch information for the particular device. The interactivity agent sends, to a particular device via the network, the translated touch information. The translated touch information causes the particular device to replicate the touch action on a display of the particular device.

Description

A computer network is a geographically distributed collection of nodes is interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio is transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such is as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
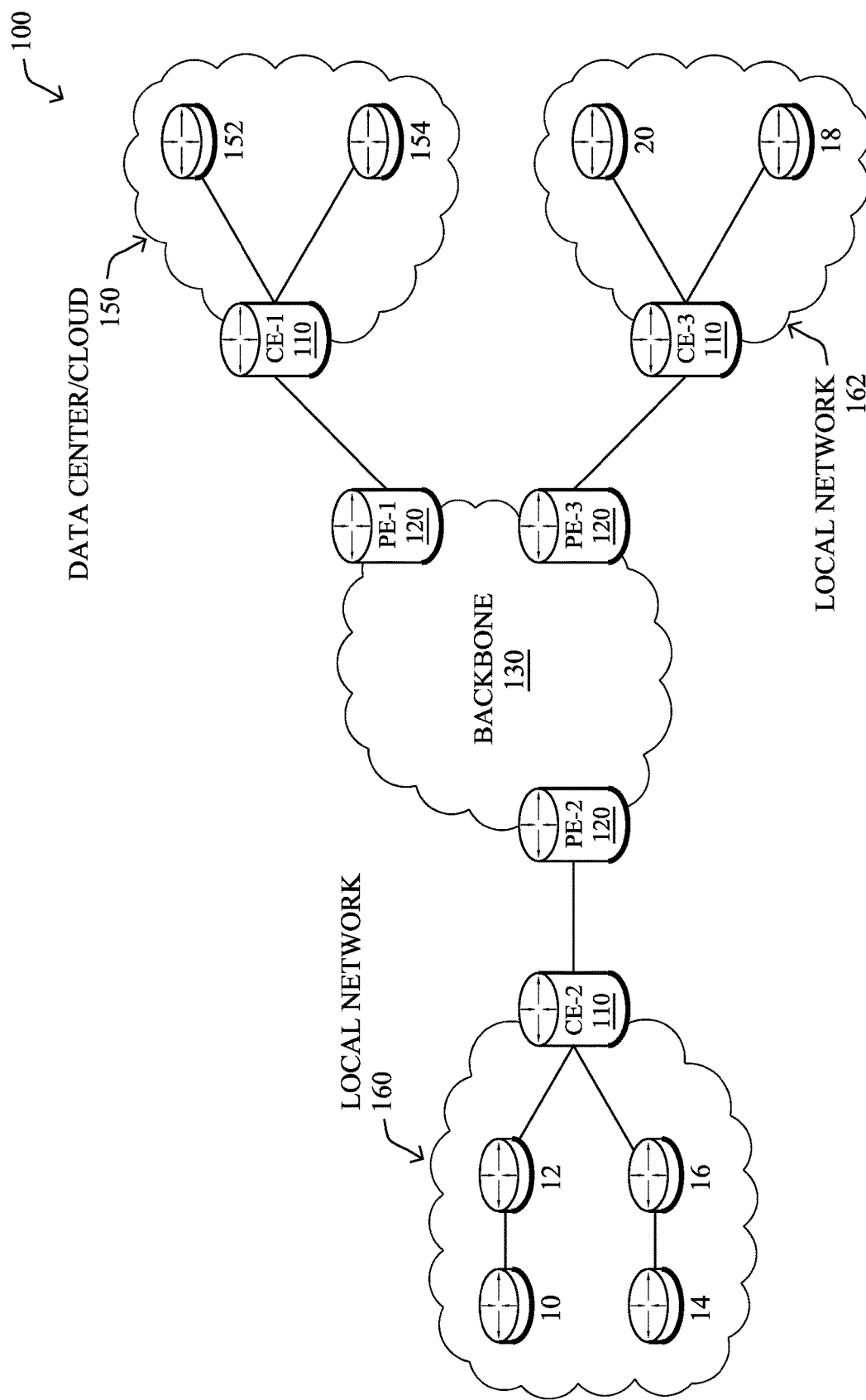

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data is center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to is thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
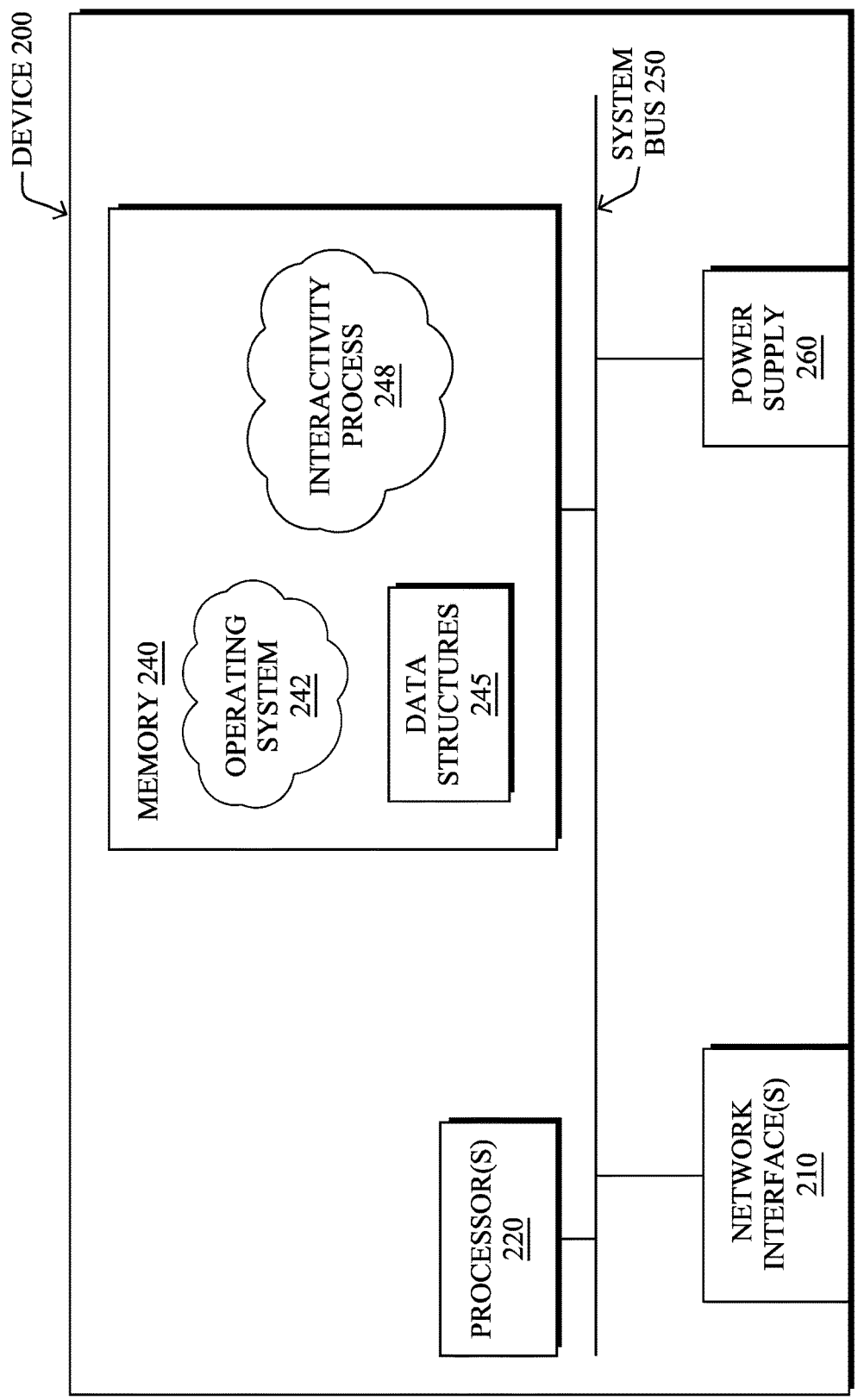
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an interactivity process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3A:
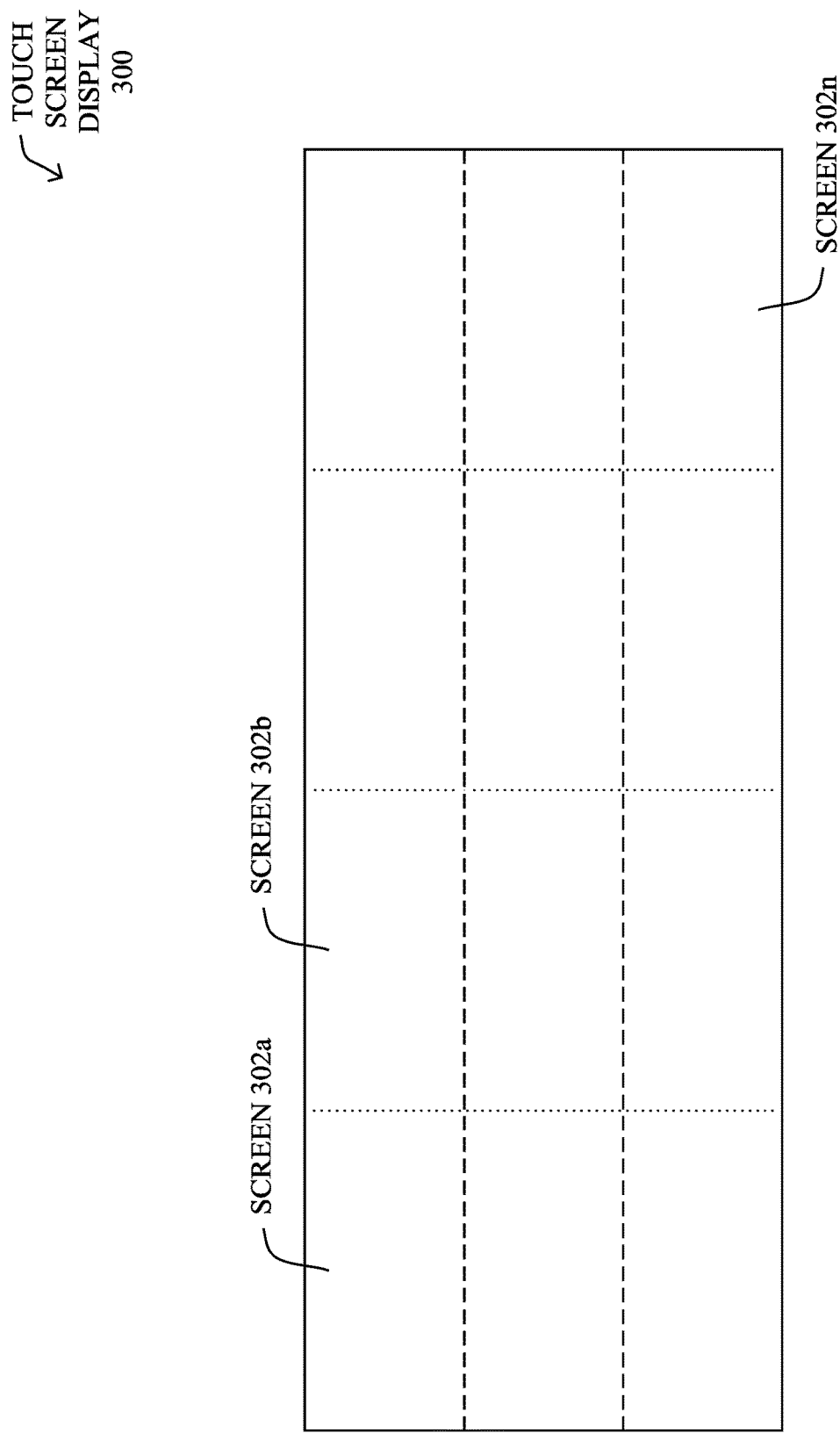
FIGS. 3A-3B illustrate examples of a touch screen display.
Figure 3B:
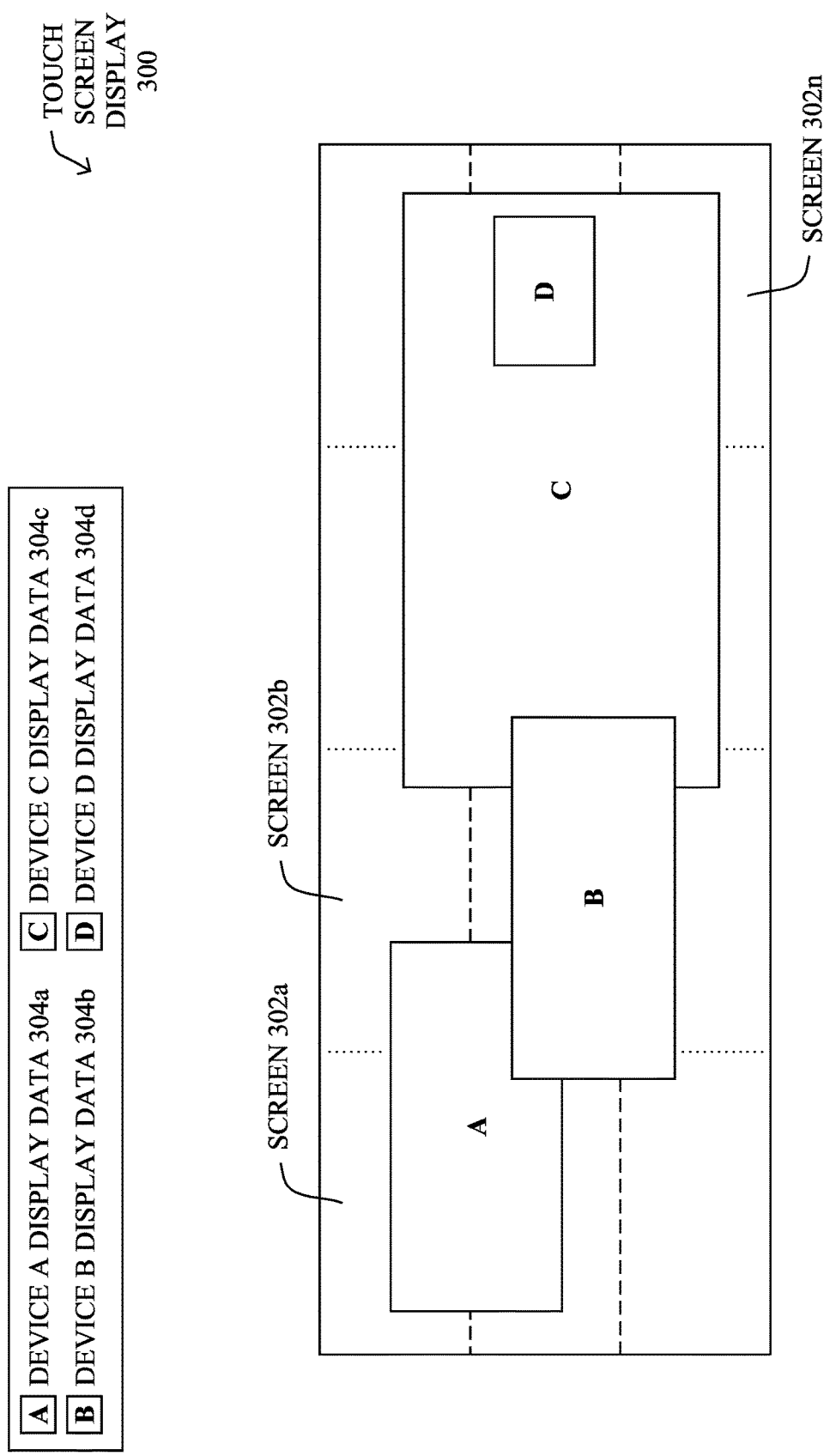

FIGS. 3A-3B illustrate examples of a touch screen display 300, according to is various embodiments. As shown in FIG. 3A, touch screen display 300 may comprise any number of individual screens 302 (e.g., a first through $n^{th}$ screen), each of which supports touch screen functionality. For example, touch screen display 300 may typically be deployed in a meeting room, auditorium, or other environment allowing multiple users to interact with touch screen display 300.

As shown in FIG. 3B, in various embodiments, display data 304 from any number of devices may be provided for simultaneous display on touch screen display 300. For example, a device A may supply display data 304a for presentation on touch screen display 300, a device B may supply display data 304b for presentation on touch screen display 300, a device C may supply display data 304c for presentation on touch screen display 300, and device D may supply display data 304d for presentation on touch screen display 300, all of which may be shown on touch screen display 300 at the same time.

Typically, display data 304 from each device will render either a digital twin of the display of that device onto touch screen display 300 or a selected portion of its display (e.g., a particular application or window). The location of display data 304a-304d on touch screen display 300 may also be fixed by the controller or can be manipulated by a user of touch screen display 300 via a touch action.

According to various embodiments, the controller for touch screen display 300 may present any of display data 304 across any number of the individual screens 302 of touch screen display 300. For example, display data 304a may be presented across screens 302a, 302b, etc. In further embodiments, display data 304a-304d may each be assigned to a different display layer, whereby the different layers are assigned an order or precedence. For example, assume that display data 304d is assigned to the highest layer, followed by display data 304b, followed by display data 304c, and followed by display data 304a at the lowest layer. Thus, when display data 304b is presented on touch screen display 300, it will be presented instead of display data 304a or 304c at the points where they overlap with display data 304b.

As noted above, current implementations of multi-device interactivity systems is typically rely on the use of one or more computers or servers, equipped with high capacity graphic cards, and all managed by the same operating system, such as Windows Surface, iOS. Android, Webex board, and the like. For example, in such a case, devices A-D, as well as the controller for touch screen display 300, would typically require each device to be running the same operating system. In addition, current approaches to controlling touch screen displays, such as touch screen display 300, rely on a single controller to control the display, whatever its size and shape is, meaning that touch events can be received only by applications running on that particular device/controller.

The above impose strong constraints on the contents and applications (e.g., a video conferencing application, an office application, etc.) that are developed for the host operating system, sometimes at a particular resolution, and possibly optimized for the device(s) managing the multi-display. In addition, these applications may need to be redeveloped for other operating systems, leading to potential incompatibilities. Accordingly, the techniques herein introduce approaches whereby the natures of the different sources are fully independent from the system on which they can be displayed and manipulated through some touch screen. In other words, thanks to the techniques herein, the touch screen display allows the users to seamlessly and simultaneously interact with multiple applications running on different operating systems across any number of devices.

Multi-Device Interactivity System for a Touch Screen Display

The techniques herein introduce a lightweight software abstraction layer allowing an interactivity system to manage a multi-operating system windowing system for single or multiple screens displays. In some aspects, the interactivity system supports touch interactions management over IP, extending the scope of input sources to remote devices and content, as well. Since the interactivity system is independent from the source devices and operating systems, integration of any existing or future device as an individual content source is easily achieved.

Specifically, according to one or more embodiments of the disclosure as described in detail below, an interactivity agent provides display data from a plurality of devices to is a touch screen display via a network for simultaneous presentation on the touch screen display. The interactivity agent receives touch information regarding a touch action performed via the touch screen display with respect to the display data from a particular one of the plurality of devices. The interactivity agent translates the received touch information from the touch screen display into translated touch information for the particular device. The interactivity agent sends, to a particular device via the network, the translated touch information. The translated touch information causes the particular device to replicate the touch action on a display of the particular device.

Illustratively, the techniques described herein may be performed by hardware, software, and/or firmware, such as in accordance with the interactivity process 248, which may include computer executable instructions executed by the processor 220 (or independent processor of interfaces 210) to perform functions relating to the techniques described herein.

Figure 4A:
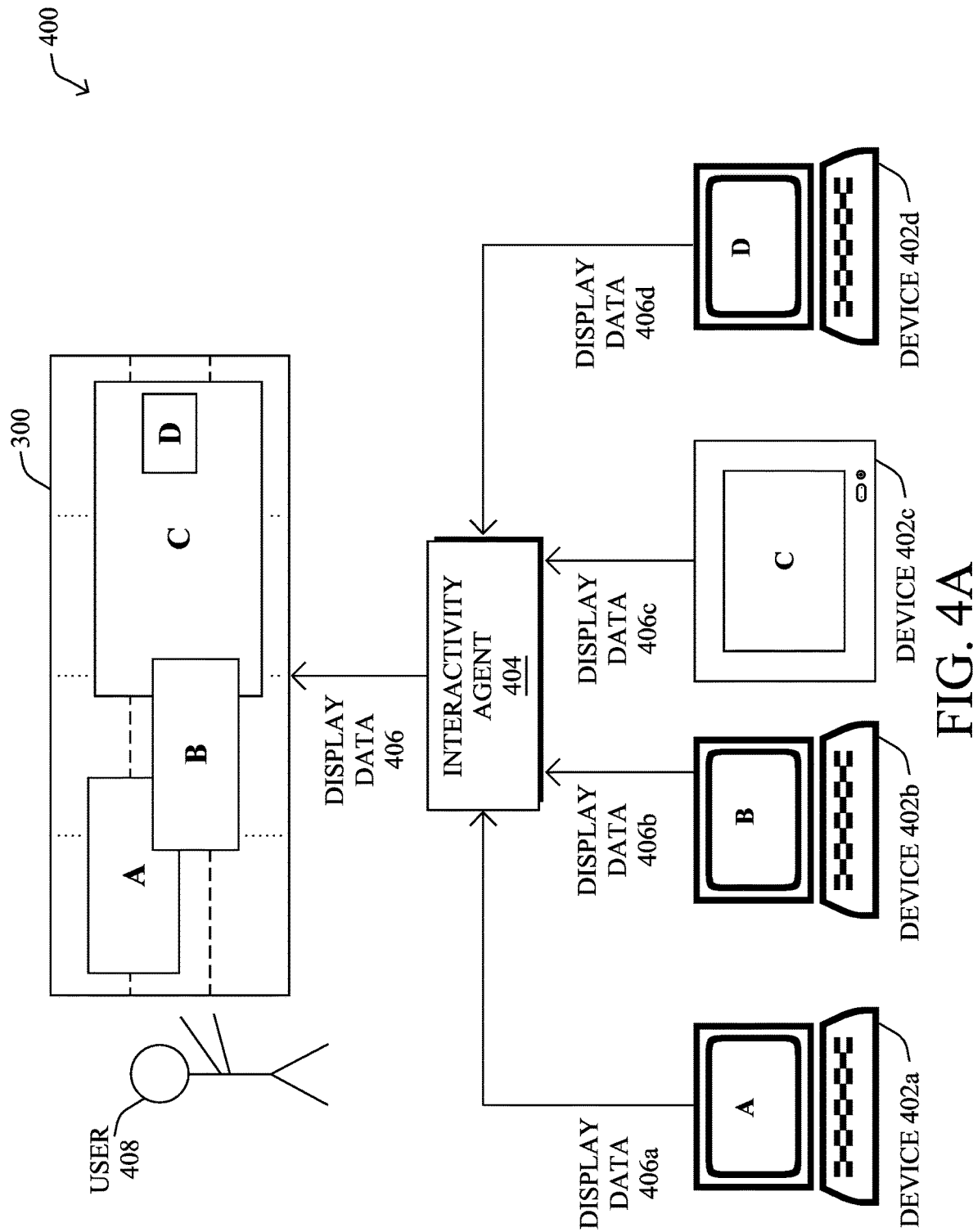
FIGS. 4A-4B illustrates an example architecture for a multi-device interactivity system for a touch screen display.
Figure 4B:
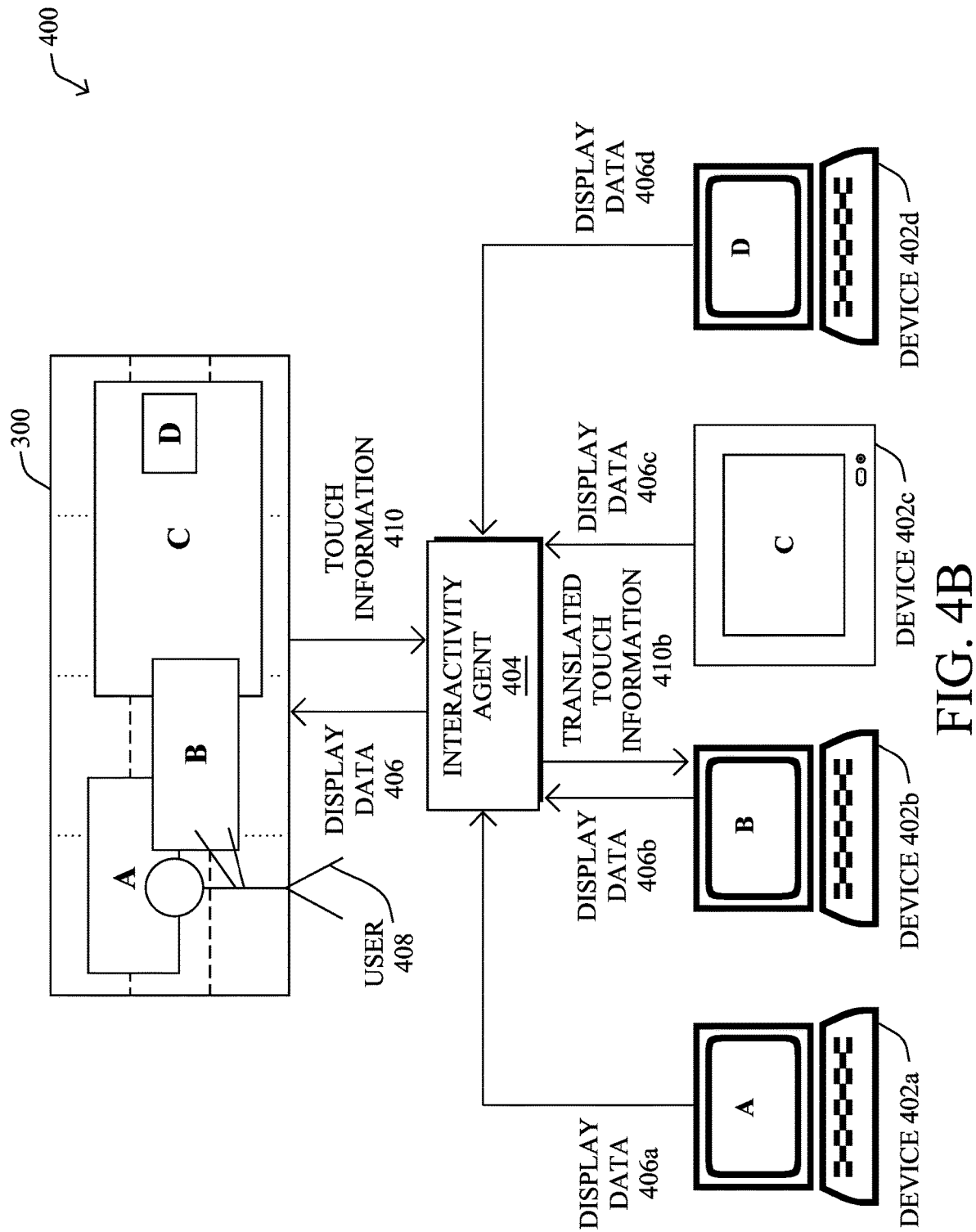

Operationally, FIGS. 4A-4B illustrates an example architecture 400 for a multi-device interactivity system for a touch screen display, according to various embodiments. Continuing the example of FIGS. 3A-3B, the techniques herein introduce an interactivity agent 404 that may be executed by touch screen display 300, any of devices 402 that provide display data 406 to touch screen display 300, or another device in communication therewith. Thus, in various embodiments, interactivity agent 404 may be implemented as a network service, either in the local network of touch screen display 300 or remotely, such as in the cloud. Accordingly, devices 402 may be physically located near one another and on the same local network or, in further cases, may be physically separated and on different local networks.

As shown in FIG. 4A, a key function of interactivity agent 404 is to provide combined display data 406 to touch screen display 300 that is based on display data received from any number of devices 402, which may vary by type and/or operating system, in various embodiments. For example, device 402a may be a Windows-based laptop, device 402b may be an iOS-based laptop, device 402c may be a WebEx Board-based device, and device 402d may be a Linux-based laptop. As would be appreciated, the number and configurations of devices 402 may differ and these specific examples are used herein for illustrative purposes only.

According to various embodiments, interactivity agent 404 may maintain a topographical and multidimensional map of the various source display data (e.g., display data 406a-406d) currently display on different windows on touch screen display 300. This allows interactivity agent 404 to know precisely, at all times, what is displayed on touch screen display 300 and where on the full display surface (e.g., the combination of the various screens of display 300). In other words, interactivity agent 404 may effectively maintain a digital twin associated with each of devices 402a-402d and any grouping information associated with devices 402a-402d, such as their IP addresses, operating systems, versions, monitor resolutions, running applications, combinations thereof, and the like. In doing so, a user 408 is able to view the display data 406 sent to touch screen display 300 from the various devices 402a-402d.

As shown in FIG. 4B, now assume that user 408 performs a touch action with respect to touch screen display 300. For example, as shown, user 408 may touch a portion of touch screen display 300 associated with display data 406b provided by device 402b. In such a case, touch screen display 300 may register the touch action and provide touch information 410 back to interactivity agent 404.

According to various embodiments herein, interactivity agent 404 may be configured to translate any touch information received from touch screen display 300 into translated touch information for the device 402 whose display data 406 was associated with the touch action performed by user 408. In turn, the device 402 receiving the translated touch information from interactivity agent 404 may replicate the corresponding touch action, locally. In some embodiments, this can be achieved by each of devices 402 executing a small client agent that communicates with interactivity agent 404 and effects the touch action on the local device 402.

For example, assume that the touch action performed by user 408 that results in is touch information 410 represents the user closing the window of a certain application being executed on device 402b. In such a case, interactivity agent 404 may translate the resulting touch information 410 from touch screen display 300 into translated touch information 410b, which it then sends on to device 402b. In turn, the translated touch information 410b may cause device 402b to close the window of its application, accordingly. Thus, architecture 400 allows for the management of much more than basic interactivity, such as by allowing for content control (e.g., launching or exiting an application on a particular source device 402, etc.).

In various embodiments, interactivity agent 404 may perform its translation of touch data from touch screen display 300 by maintaining sets of coordinate maps between touch screen display 300 and the various displays of devices 402a-402d. To do so, interactivity agent 404 may maintain a set of properties of touch screen display 300, such as the size of its physical surface (e.g., 4800 mm width×2040 mm height, 16' width×9' height, etc.), which are mapped to the properties of the touch system, especially its resolution (e.g., 1920×1080, 2048×2048, etc.).

Figure 5:
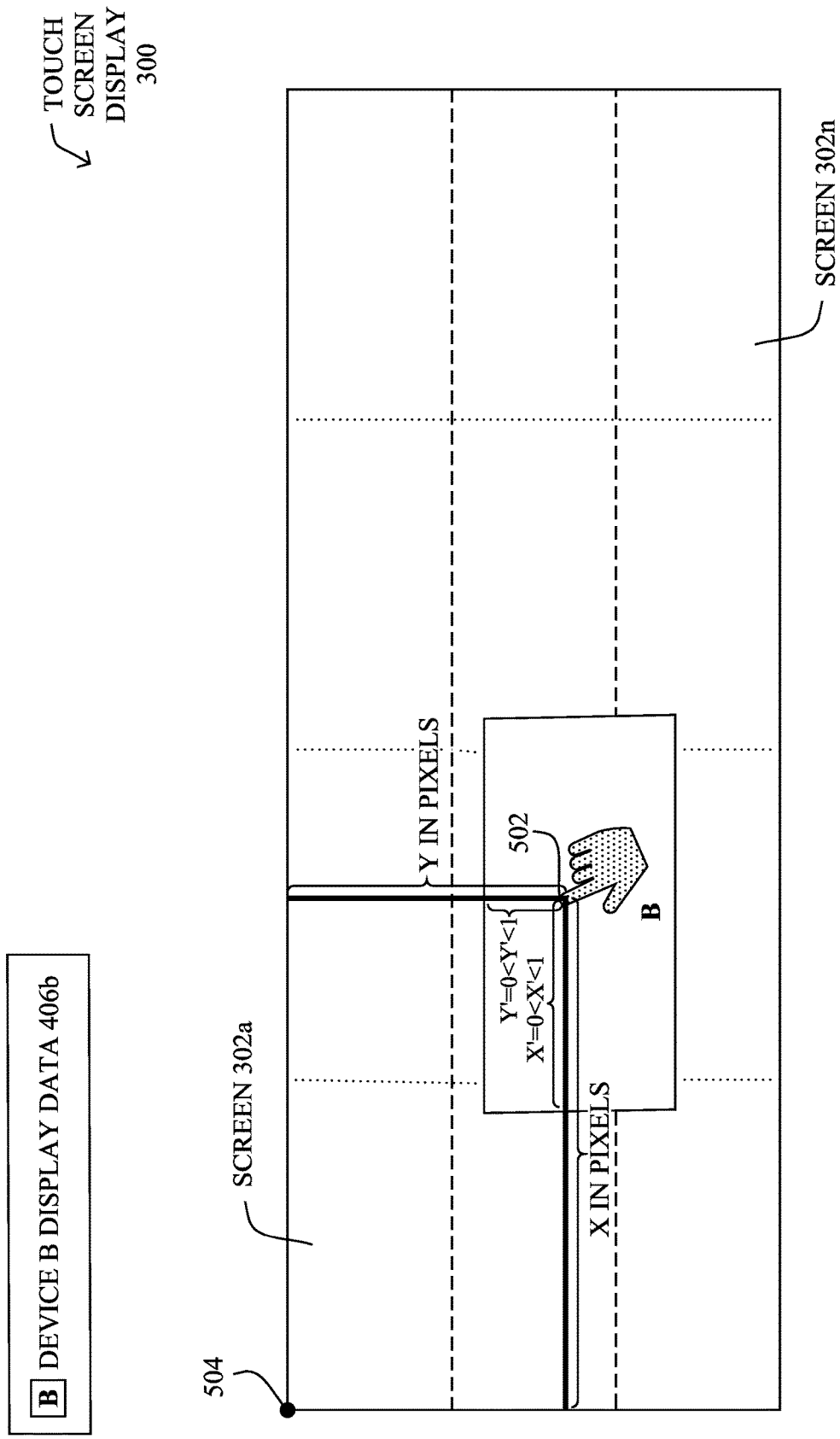
FIG. 5 illustrates an example of the translation of coordinates between displays.

FIG. 5 illustrates an example 500 of the translation of coordinates between displays, according to various embodiments. As shown, assume that user 408 performs a touch action with respect to touch screen display 300 at a point 502, where display data 406b from device 402b in FIGS. 4A-4D is currently being displayed. As detailed above, display data 406 from any number of other devices 402 may also be displayed simultaneously on touch screen display 300. In response to the touch action, touch screen display 300 may identify the coordinates of the and transmit these coordinates to interactivity agent 404 as part of touch information 410 mentioned previously. For example, in some embodiments, these coordinates may be relative to the specific screen 302 of touch screen display 300 that was touched.

In response to receiving the touch information 410 from touch screen display 300, interactivity agent 404 may convert the received coordinates according to the resolution of display 300 into a set of coordinates X, Y, according to the real size of the display. For example, as shown, the X, Y coordinates of the touch action at point 502 may be is relative to an origin 504 located at the top left corner of touch screen display 300. As would be appreciated, the location of origin 504 for the coordinate system can be selected as desired. In an alternate embodiment, touch screen display 300 itself may identify the X, Y coordinates of the touch relative to its full display surface and transmit them to interactivity agent 404 as part of touch information 410. In either case, interactivity agent 404 will now have the precise coordinates of the touch action at point 502 relative to the display surface.

In various embodiments, interactivity agent 404 may then perform a lookup of the current mapping associated with device 402b and its corresponding digital twin (e.g., what is displayed on device 402b). In turn, interactivity agent 404 may translate the X, Y coordinates into a translated set of coordinates X', Y' by calculating the relative horizontal and vertical positions within the display window of device 402b, respectively. For example, these X' and Y' coordinates may be represented as values ranging between 0 and 1 from a point of origin located on the display window of device 402b, similar to how coordinates X, Y are calculated relative to touch screen display 300 (e.g., the top left corner of the display of device 402b, another point, etc.).

Referring again to FIG. 4B, once interactivity agent 404 has translated the coordinates indicated by touch information 410 into coordinates relative to device 402b, it may send translated touch information 410b to device 402b, to cause device 402b to replicate the touch action. In various embodiments, translated touch information 410b sent to device 402b may simply include the translated coordinates X', Y' and the client agent of device 402b may enact the corresponding touch action relative to the display of device 402b.

As would be appreciated, not all devices support the same sets of interactivity modes. For example, Table 1 below shows the interactivity modes supported by various operating systems:

TABLE 1

| Operating System | IP Prog. | Keyboard/ Mouse | Touch-Point | Gesture | Multi-Touch | Voice |
|---|---|---|---|---|---|---|
| Linux | Native and according applications | Native | no | no | no | no |
| Windows v.7 home/starter | | | no | no | no | no |
| Windows v7/v8 | | | yes | yes | yes | Speach |
| Windows v10/Surface | | | yes | yes | yes | Cortana |
| MacOS | | | no | no | no | no |
| iOS | | Yes, via interface driver | | | native | Ski |
| Android >kitkat | | | native Manufacturer | native | According to | OK Google |
| Cisco Collab | yes | N/A | yes | no | no | no |
| Webex Board | yes | N/A | Yes/ software | Yes/ software | Yes/ software | no |

In other words, not every device type may event support touch actions.

According to various embodiments, translated touch information 410b may cause device 402b to simulate input from another interactivity mechanism, if device 402b does not support touch actions. For example, assume that device 402b does not have a touch display, itself (e.g., device 402b is running MacOS). In such a case, translated touch information 410b may cause the local client of device 402b to use the translated coordinates from touch information 410b to simulate input from a mouse, touch pad, or other pointing device clicking on that location on the display of device 402b. Thus, in some cases, architecture 400 can support touch actions with respect to devices and operating systems that do not natively do so.

As noted above, various network implementations are possible with respect to architecture 400, in various embodiments. For example, while devices 402a-402d may typically all be located within the same room as touch screen display 300 and on the same local network, further embodiments of architecture 400 also provide for these devices to be located in a highly distributed manner. For example, interactivity agent 404 may be implemented as a cloud-based service and an IP relay of touch screen display 300 may facilitate communications with the cloud-based interactivity agent 404, which can be integrated directly into display 300 or as a peripheral device (e.g., as a USB device plugged into display 300, etc.). Thus, in some cases, user 408 could even effect touch actions to occur on a particular device 402 located remotely, simply by performing a touch action with respect to touch screen display 300.

As would be appreciated, interactivity agent 404 may also maintain a set of control parameters that control the operation of architecture 400. For example, one control parameter may specify whether touch actions are allowed with respect to any of display data 406a-406d (e.g., user 408 can interact with the display data from device 402b on touch screen display 300, but not from device 402c). Other control parameters may control where display data 402a-402d appear on touch screen display 300 and on which display layers. A further control parameter may control whether user 408 is able to relocate the display of any of the various windows on touch screen display 300 (e.g., whether user 408 can move the display data from device 402b to another location on display 300, etc.). Such control parameters can be predefined or altered directly on the device executing interactivity agent 404 or by a device having administrative permissions architecture 400 (e.g., any of devices 402a-402d, another device, etc.).

Figure 6:
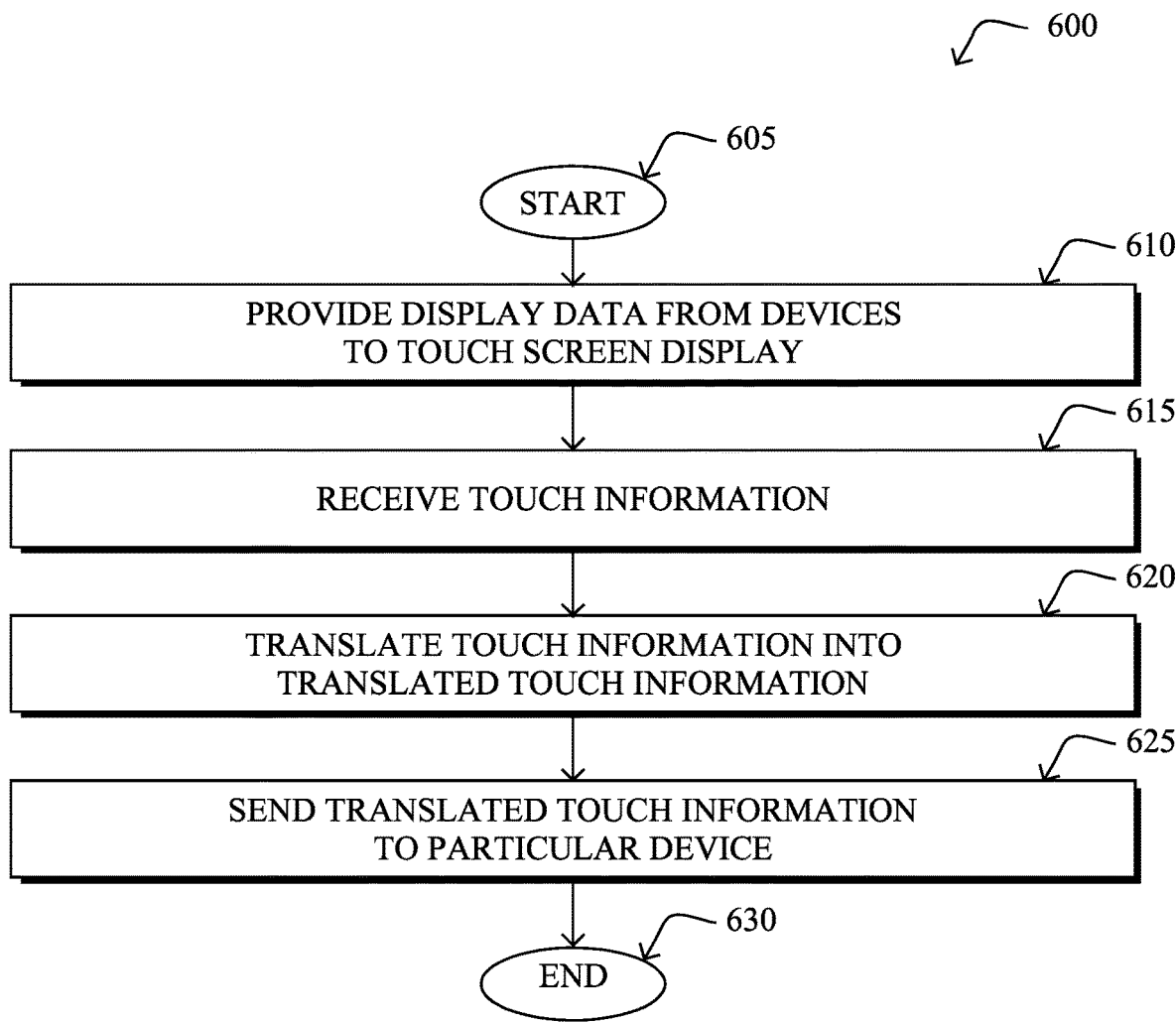
FIG. 6 illustrates an example simplified procedure for interacting with a touch screen display.

FIG. 6 illustrates an example simplified procedure for interacting with a touch screen display, in accordance with one or more embodiments described herein. For example, a non-generic, specifically configured device (e.g., device 200) may perform procedure 600 by executing stored instructions (e.g., process 248), to provide an is interactivity agent/service to a network. The procedure 600 may start at step 605, and continues to step 610, where, as described in greater detail above, the interactivity agent provides display data from a plurality of devices to a touch screen display via a network for simultaneous presentation on the touch screen display. In various embodiments, the touch screen display may comprise one or more different display screens. In further embodiments, at least one of the devices in the plurality executes a different operating system than that of another device in the plurality. In various embodiments, the interactivity agent may also assign the display data from each of the plurality of devices to a corresponding display layer such that the display data from one of the plurality of devices obscures at least a portion of the display data from another one of the plurality of devices when simultaneously presented on the touch screen display. For example, the display data from a device A may supersede the display data from device B on the touch screen display at an overlapping point, if the display data from device A is assigned to a higher layer than that of device B.

At step 615, as detailed above, the interactivity agent may receive touch information from the touch screen display regarding a touch action performed via the display with respect to the display data from a particular one of the plurality of devices. In some embodiments, the touch information may comprise a set of coordinates associated with the performed touch action. In further embodiments, the touch action may span two or more of the display screens of the touch screen display.

At step 620, the interactivity agent may translate the received touch information into translated touch information for the particular device, as described in greater detail above. In various embodiments, the agent may convert the set of coordinates in the received touch information that is relative to the touch screen display into a set of coordinates relative to the display of the particular device. For example, the agent may generate and maintain a mapping of coordinates relative to the touch screen display to sets of coordinates relative to display of each of the plurality of devices. The translation can be done, too, based in part on the resolution of the touch screen display and/or that of is the particular device.

At step 625, as detailed above, the interactivity agent may send the translated touch information to the particular device. In various embodiments, the translated touch information may cause the particular device to replicate the touch action on its own display (e.g., by opening an application, closing an application, dragging a window, etc.). In some cases, the particular device may not support touch actions. Accordingly, in further embodiments, the translated touch information may cause the particular device to simulate input from at least one of: a touchpad of the particular device, a keyboard of the particular device, or a mouse of the particular device. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce techniques that allow for multiple devices, potentially executing different operating systems, to all provide display data to a (multi-screen) touch screen display, simultaneously. In some aspects, the techniques herein abstract both dimension and aspect ratio of the (multi-screen) display and the resolution of the interactivity (touch) system while preserving its accuracy, so as to translate any touch actions performed on the touch screen display for replication on the source device. To do so, the system may provide the information of interactivity to the final source corresponding to the digital twin independently from the nature of the source device, operating system, interface protocol, native resolution, etc., as well as its graphic or windowing system.

While there have been shown and described illustrative embodiments that provide for a multi-device interactivity system for a touch screen display, it is to be understood is that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   providing, by an interactivity agent, display data from a plurality of devices to a touch screen display via a network for simultaneous presentation on the touch screen display;
   receiving, at the interactivity agent, touch information regarding a touch action performed via the touch screen display with respect to the display data from a particular one of the plurality of devices, wherein the particular device executes a different operating system than that of another device in the plurality of devices, further wherein the plurality of devices executes one or more of Windows or iOS;
   translating, by the interactivity agent, the received touch information from the touch screen display into translated touch information for the particular device; and
   sending, by the interactivity agent and to the particular device via the network, the translated touch information, wherein the translated touch information causes the particular device to replicate the touch action on a display of the particular device by simulating input from a non-touch display input mechanism of the particular device.

2. The method as in claim 1, wherein providing the display data from the plurality of devices to the touch screen display via the network for simultaneous presentation on the touch screen display comprises:
   assigning, by the interactivity agent, the display data from each of the plurality of devices to a corresponding display layer such that display data from one of the plurality of devices obscures at least a portion of the display data from another one of the plurality of devices when simultaneously presented on the touch screen display.

3. The method as in claim 1, wherein the translated touch information causes the particular device to simulate the input from at least one of: a touchpad of the particular device, a keyboard of the particular device, or a mouse of the particular device.

4. The method as in claim 1, wherein the received touch information indicates a set of coordinates relative to the touch screen display and associated with the touch action, and wherein translating the received touch information from the touch screen display into the translated touch information for the particular device comprises:
   converting the set of coordinates relative to the touch screen display into a set of coordinates relative to the display of the particular device.

5. The method as in claim 4, wherein converting the set of coordinates relative to the touch screen display into the set of coordinates relative to the display of the particular device is based in part on a resolution of the touch screen display.

6. The method as in claim 4, wherein providing the display data from the plurality of devices to the touch screen display via the network for simultaneous presentation on the touch screen display comprises:
generating a mapping of coordinates relative to the touch screen display to sets of coordinates relative to display of each of the plurality of devices, wherein converting the set of coordinates relative to the touch screen display into the set of coordinates relative to the display of the particular device is based in part on that mapping.

7. The method as in claim 1, wherein the touch screen display comprises a plurality of display screens.

8. The method as in claim 7, wherein the touch action spans two or more of the plurality of display screens.

9. An apparatus, comprising:
one or more network interfaces;
a processor coupled to the network interfaces and configured to execute one or more processes; and
a memory configured to store a process executable by the processor, the process when executed configured to:
provide display data from a plurality of devices to a touch screen display via a network for simultaneous presentation on the touch screen display;
receive touch information regarding a touch action performed via the touch screen display with respect to the display data from a particular one of the plurality of devices, wherein the particular device executes a different operating system than that of another device in the plurality of devices, further wherein the plurality of devices executes one or more of Windows or iOS;
translate the received touch information from the touch screen display into translated touch information for the particular device; and
send, to the particular device via the network, the translated touch information, wherein the translated touch information causes the particular device to replicate the touch action on a display of the particular device by simulating input from a non-touch display input mechanism of the particular device.

10. The apparatus as in claim 9, wherein the apparatus provides the display data from the plurality of devices to the touch screen display via the network for simultaneous presentation on the touch screen display by:
assigning the display data from each of the plurality of devices to a corresponding display layer such that display data from one of the plurality of devices obscures at least a portion of the display data from another one of the plurality of devices when simultaneously presented on the touch screen display.

11. The apparatus as in claim 9, wherein the translated touch information causes the particular device to simulate the input from at least one of: a touchpad of the particular device, a keyboard of the particular device, or a mouse of the particular device.

12. The apparatus as in claim 9, wherein the received touch information indicates a set of coordinates relative to the touch screen display and associated with the touch action, and wherein the apparatus translates the received touch information from the touch screen display into the translated touch information for the particular device by:
converting the set of coordinates relative to the touch screen display into a set of coordinates relative to the display of the particular device.

13. The apparatus as in claim 12, wherein converting the set of coordinates relative to the touch screen display into the set of coordinates relative to the display of the particular device is based in part on a resolution of the touch screen display.

14. The apparatus as in claim 12, wherein the apparatus provides the display data from the plurality of devices to the touch screen display via the network for simultaneous presentation on the touch screen display by:
generating a mapping of coordinates relative to the touch screen display to sets of coordinates relative to display of each of the plurality of devices, wherein converting the set of coordinates relative to the touch screen display into the set of coordinates relative to the display of the particular device is based in part on that mapping.

15. The apparatus as in claim 9, wherein the touch screen display comprises a plurality of display screens.

16. The apparatus as in claim 15, wherein the touch action spans two or more of the plurality of display screens.

17. A tangible, non-transitory, computer-readable medium storing program instructions that cause an interactivity agent to execute a process comprising:
providing, by the interactivity agent, display data from a plurality of devices to a touch screen display via a network for simultaneous presentation on the touch screen display;
receiving, at the interactivity agent, touch information regarding a touch action performed via the touch screen display with respect to the display data from a particular one of the plurality of devices, wherein the particular device executes a different operating system than that of another device in the plurality of devices, further wherein the plurality of devices executes one or more of Windows or iOS;
translating, by the interactivity agent, the received touch information from the touch screen display into translated touch information for the particular device; and
sending, by the interactivity agent and to the particular device via the network, the translated touch information, wherein the translated touch information causes the particular device to replicate the touch action on a display of the particular device by simulating input from a non-touch display input mechanism of the particular device.

* * * * *

UNITED STATES PATENT AND TRADEMARK OFFICE
CERTIFICATE OF CORRECTION

PATENT NO. : 11,327,707 B1
APPLICATION NO. : 16/844152
DATED : May 10, 2022
INVENTOR(S) : Thierry Gruszka et al.

It is certified that error appears in the above-identified patent and that said Letters Patent is hereby corrected as shown below:

In the Specification

Column 1, Line 63, please amend as shown:
lection of nodes interconnected by communication links Column 2, Line 35, please amend as shown:
generally be equipped with a radio transceiver or other Column 3, Line 10, please amend as shown:
potentially also with a backup link, such as a wireless Column 3, Line 51, please amend as shown:
as well as a data center/cloud environment 150 that Column 4, Line 24, please amend as shown:
LLNs are comprised of anything from a few dozen to Column 5, Line 43, please amend as shown:
300, according to various embodiments. As shown in FIG.

Column 6, Line 16, please amend as shown:
interactivity systems typically rely on the use of one or Column 6, Line 19, please amend as shown:
system, such as Windows Surface, iOS, Android, Webex Column 6, Line 60, please amend as shown:
provides display data from a plurality of devices to a touch Signed and Sealed this
Ninth Day of August, 2022

Katherine Kelly Vidal
*Director of the United States Patent and Trademark Office*

Column 8, Line 8, please amend as shown:
user 408 that results in touch information 410 represents Column 8, Line 50, please amend as shown:
coordinates of the touch action at point 502 may be Table 1, Column 9, Lines 32-33, please replace as shown:
Android     interface     native  native  According to   OK
>kitkat     driver                        Manufacturer   Google Column 10, Line 41, please amend as shown:
permissions in architecture 400 (e.g., any of devices 402*a*-

Column 10, Line 48, please amend as shown:
instructions (e.g., process 248), to provide an interactivity Column 11, Line 23, please amend as shown:
of the touch screen display and/or that of the particular Column 11, Line 61, please amend as shown:
system for a touch screen display, it is to be understood